Nov. 30, 1937.  C. LE BLEU  2,100,445

TRAIL BUILDER

Filed April 2, 1935   2 Sheets-Sheet 1

INVENTOR
CHARLES LE BLEU
BY James M. Abbott
ATTORNEY

Patented Nov. 30, 1937

2,100,445

UNITED STATES PATENT OFFICE 2,100,445

TRAIL BUILDER

Charles Le Bleu, Los Angeles, Calif.

Application April 2, 1935, Serial No. 14,235

13 Claims. (Cl. 37—144)

This invention relates to apparatus for moving dirt, and the like, and particularly pertains to a trail builder.

In operations requiring the movement of dirt, snow, and the like, to spread, level and to fill in materials it is common practice to use a tractor propelled dirt moving machine having a horizontally disposed blade extending transversely of it and in advance thereof, said blade being supported in a manner to be readily manipulated so that it can be bodily raised or lowered, or tilted, in a vertical plane, and it is the principal object of the present invention to provide a device of the present type generally indicated as a trail builder, and which device embodies means for mounting the blade with relation to the tractor structure and its running gear so that it may be easily manipulated, and so that the blade will maintain a set position, or may be readily moved from one set position to another by simple and effective means.

The present invention contemplates the provision of a tractor structure having track layer units at the opposite sides thereof from which a blade supporting frame and a blade are carried, said structure being further provided with means whereby the opposite sides of the frame structure may be lifted with relation to each other, or simultaneously moved with relation to each other for rapidly adjusting and setting the blade, and insuring that unequal strain imposed upon the blade will be compensated for in an automatic manner by the operating mechanism.

The invention is illustrated by way of example in the accompanying drawings in which.

Figure 1:
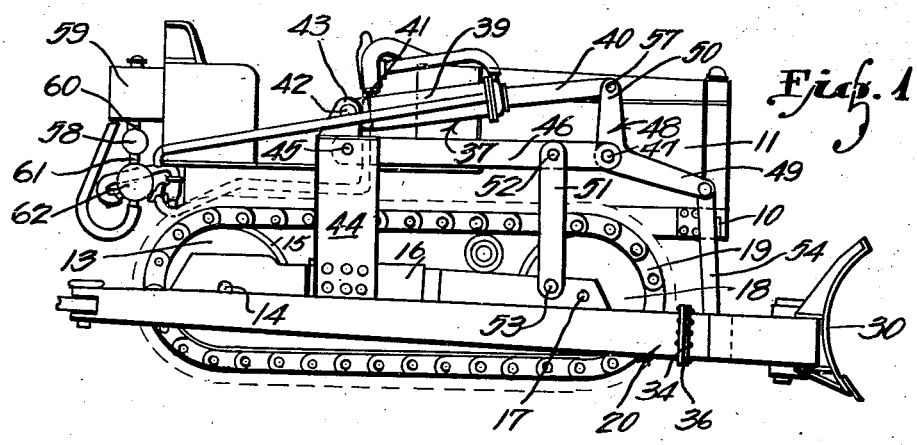
Figure 1 is a view in side elevation showing a trail builder of the type with which the present invention is concerned.
Figure 2:
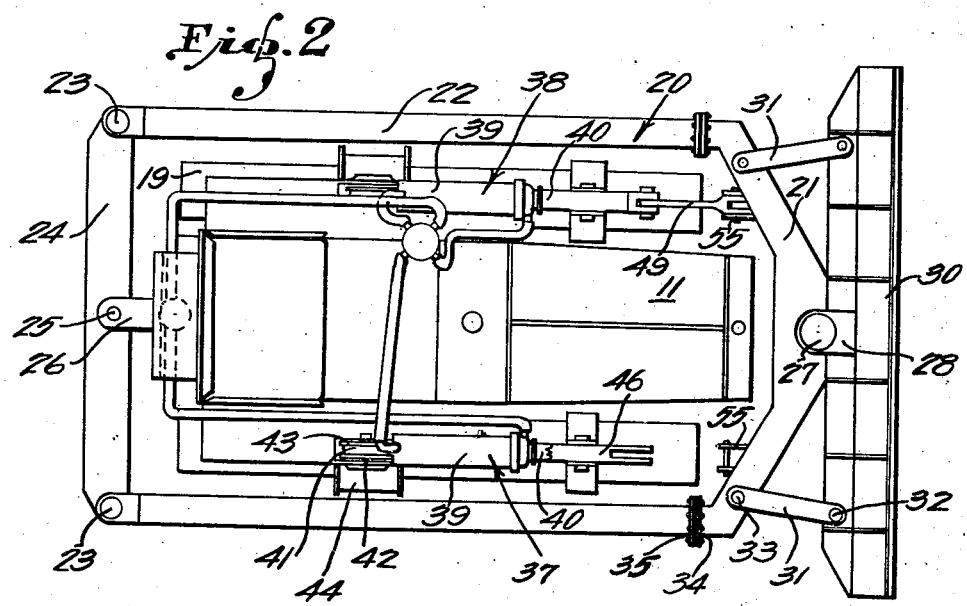
Fig. 2 is a view in plan showing the details of the structure and particularly the power means for raising and lowering the device.

Referring more particularly to the drawings, 10 indicates a tractor main frame upon which is mounted an engine structure 11. The main frame is supported upon a running gear comprising a pair of track layer units 13 which are pivoted at their rear ends upon a driving axle 14. The driving axle carries track driving sprockets 15, the axle being mounted upon a track frame 16. The forward end of the track frame carries axles 17 and idler sprockets 18 around which an endless track 19 is led. Extending across the front of the tractor structure and along opposite sides is a U-shaped blade supporting frame 20 which comprises a transverse header 21 and opposite side rails 22. The rear ends of the side rails are formed with spaced bearing members 23 to receive the opposite ends of the frame supporting and equalizer bar 24. This bar is mounted upon a central pivot pin 25 carried by a shackle member 26 which is disposed at the rear of the tractor and carried by the main frame. The member 26 is provided to give the equalizer bar 24 swinging movement in a horizontal plane and also to allow a limited vertical swinging movement along the longitudinal center of the tractor. At the center of the header 21 a vertical pivot pin 27 is mounted. This pin also passes through bearing members 28 secured upon the rear face of a blade 30. The blade 30 is shown in Fig. 1 of the drawings as being arcuately curved in a vertical direction. It will be understood that various types and forms of blade might be used without departing from the spirit of the present invention. The blade as shown in Fig. 2 of the drawings has an overall length greater than that of the width of the frame structure and is secured to the frame structure 20 near its opposite ends by horizontal links 31 which are pivoted to the back of the blade upon pins 32 and which are pivoted to the opposite ends of the headers upon pins 33. The opposite ends of the headers and the side rails are provided with bolting flanges 34 and 35 between which a piece of yieldable material 36, such as sheet rubber, is disposed. Bolts are provided to secure the flanges together with their interposed resilient member, thus affording slight yieldability between the side rails and the header.

The frame structure 20 with the blade 30 may be moved vertically to adjust the blade in different horizontal planes or to tilt the blade transversely. The means for accomplishing this comprises a pair of hydraulic jacks 37 and 38 which each comprise a cylinder 39 and a piston 40. The base of each cylinder is provided with a pivot lug 41 to receive a pivot pin 42 and by which the cylinder is fixed to bearing members 43 of a vertical bracket 44. The brackets 44 are rigidly fastened to the side frame members 16 and extend vertically therefrom. The brackets also carry pivot pins 45 passing through the rear ends of horizontal links 46. The forward ends of each of the links 46 are provided with pivot pins 47 to receive a bell crank 48. The bell cranks 48 have a substantially horizontal long lever arm 49 and a substantially vertical lever arm 50 which is relatively shorter than the arm 49. At a point intermediate the pivot pin 45 at one end of the horizontal link 46 and the pin 47, at their opposite ends, a vertical link 51 is provided. This link is pivoted to the member 46 by a pivot pin 52 and to the side frame 16 of the track layer units by a pivot pin 53. The horizontal lever arm 49 of each of the bell cranks 48 extends forwardly and receives a shackle 54 which is connected to ears 55 on the header 21 by pivot pins 56. The vertical lever arms 50 of the bell cranks 48 are pivotally engaged by the piston rods 40 which are connected therewith by pivot pins 57. It will thus be evident that as the piston rods 40 reciprocate within their cylinders that the bell cranks 48 will be swung upwardly and downwardly and will correspondingly raise and lower the blade supporting frame.

Figure 3:
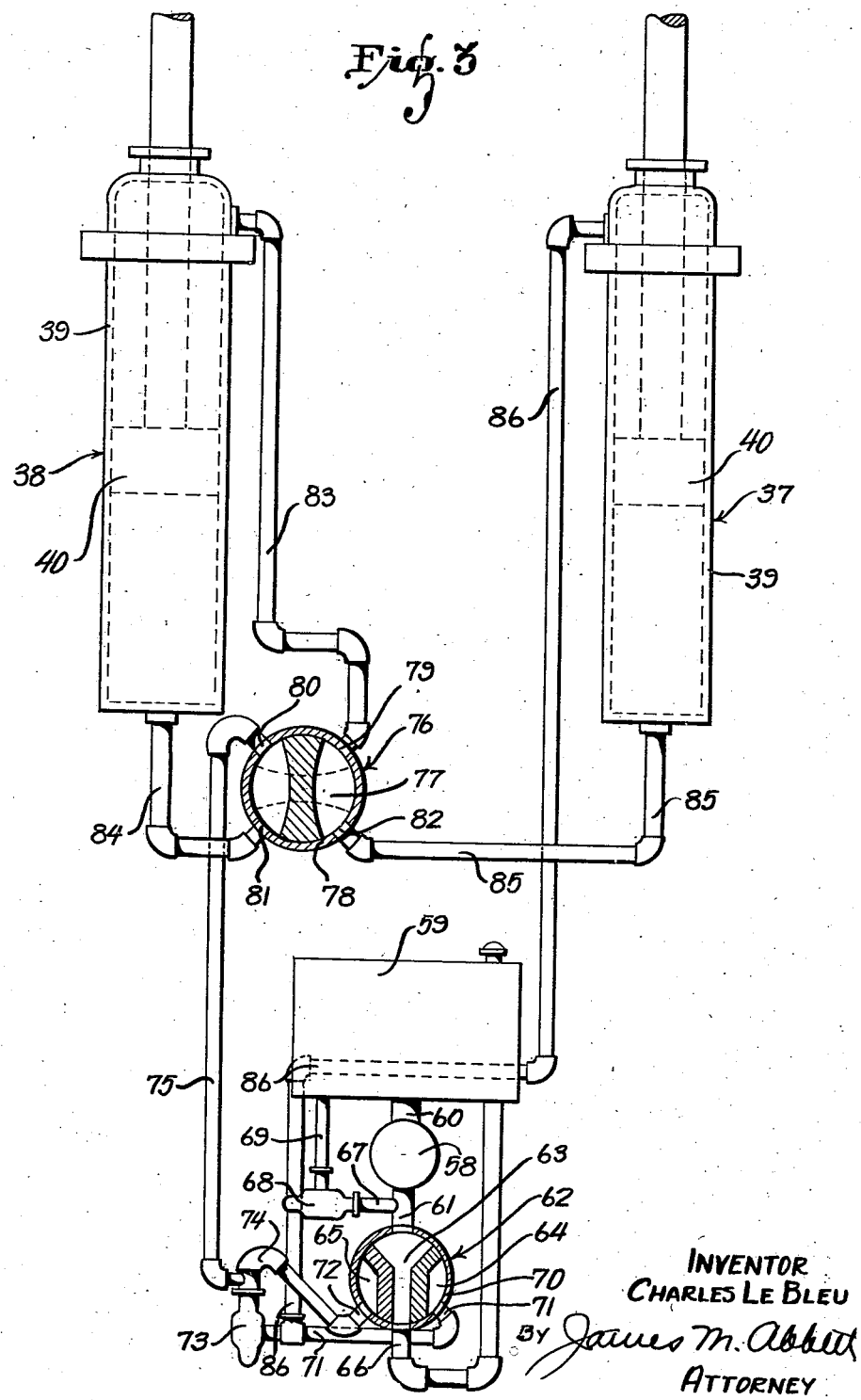
Fig. 3 is an enlarged view in diagram showing the hydraulic jack equipment for the machine and means for controlling the same.

In the present case a novel means is provided for separately or simultaneously actuating the hydraulic jacks 37 and 38. The hydraulic jacks 37 and 38 are generally indicated in the diagram Fig. 3 of the drawings. In these jacks attention is directed to the fact that the diameter of jack 37 is less than the diameter of the jack 38. The amount of difference is occasioned by the fact that the two jacks may be operated in series, thus making it necessary to cause the displacement in the two jacks to be the same, irrespective of the fact a piston rod extends through the fluid on one side of the piston in each of the jacks. The jacks are supplied with hydraulic fluid under pressure from a suitable pump 58. This pump is fed from a tank 59 supplying an incompressible fluid and connects therewith through a pipe 60. A pipe 61 leads from the pipe 60 to a master valve 62 having a central passageway 63 therethrough and opposite side passageways 64 and 65. In the position of the master valve as shown in Fig. 3 of the drawings, fluid from the pump leads directly to a pipe 66 connected with the supply tank 59 thus affording a return flow of the incompressible fluid to the tank when the valve is in its neutral position. Interposed between the pump 58 and the valve 62, and in connection with the pipe 61, is a relief pipe 67 communicating with a relief valve 68 which in turn connects with the tank 59 through a pipe 69, thus relieving pressure under certain circumstances. The valve housing 70 of the valve 62 is provided with outlet pipes 71 and 72 through which a flow of fluid may be established from the pump 58 through the passageway 63 when the rotary valve element is moved, so that its eduction side will be in register with either the pipe 71 or the pipe 72. The pipe 71 connects with a relief valve 73 which valve also connects by means of a pipe 74 with the pipe 72. The pipe 74 is in constant communication with a pipe 75 leading to a secondary control valve 76. This valve has a rotary valve member 77 within its housing to establish a flow of incompressible fluid through the jacks 37 and 38 in select and alternate directions. The housing 78 of the valve 76 has ports 79, 80, 81, and 82. These ports are shown as being spaced at 90° to each other around the circumference of the valve housing. The pipe 75 communicates with the port 80. A pipe 83 communicates with the port 79 and leads to one end of the cylinder 39 of the jack 38. The opposite end of this cylinder is fitted with a pipe 84 which connects to port 81 of the valve housing. A pipe 85 establishes communication between the valve and the end of cylinder 39 of jack 37. A pipe 86 leads from the opposite end of the cylinder of jack 37 and to the pipe 71 previously described as connecting with the valve housing 70 of the valve 62.

In operation of the present invention the entire structure is assembled as shown in the drawings so that manipulation of the valves 62 and 76 may be made to raise or lower, or tilt the blade 30. In the neutral position of the valve 62 the passageway 63 establishes direct communication from the pump 58 to the return pipe 66, while the pipes 71 and 72 communicate with the relief ports 64 and 65. When it is desired to energize both of the jacks the rotary valve member 77 may be placed in the position indicated in Fig. 3 and the rotary member of the valve 62 may be swung so that its passageway 63 will register with the pipe 72. Fluid will then pass to the pipe 75, thence through port 80 into the valve 76. This fluid will then pass out through the port 81 to the pipe 84 and to the base of the cylinder in the jack 38. The piston 38' will then be moved lengthwise of the cylinder and will actuate the corresponding piston rod to swing the bell crank 48 connected therewith. Due to the fact that there is fluid within the head of the cylinder of the jack 38 beyond the piston 38' this fluid will be forced outwardly through the pipe 83 to the valve 76 where it will pass from port 79 to port 82 and thence along pipe 85 to the base of the cylinder of jack 37. This will force the piston 37' outwardly and will cause the piston 40 of jack 37 to move simultaneously with the piston of jack 38 and in the same direction. Attention is directed to the fact that due to the presence of the piston rod 40 connected with piston 38' in the jack 38 there will be a smaller volume of incompressible fluid displaced than that entering the jack 38 upon the opposite side of the piston, and since this volume of fluid is delivered to the base end of jack 37 it is necessary that the diameter of the jack 37 be sufficiently less than the diameter of the jack 38 so as to insure that the quantity of fluid displaced from the top of jack 38 and into the bottom of jack 37 will be equal, thus insuring simultaneous movement of both the pistons 40 and the bell cranks 48. The fluid displaced by the piston 37' of the jack 37 will be forced outwardly through pipe 86 to the pipe 71. The fluid can bypass the valve through the relief valve 73 to the opposite side of the system through the pipe 74.

In the event that the valve 62 is moved so that the valve port 68 registers with the pipe 71 fluid will pass in a counterdirection through pipe 71 to pipe 86 and thence into the upper end of the cylinder of jack 37. This will force the piston 37' downwardly and will produce a displacement of fluid from the bottom of the cylinder 37 through pipe 85 to the valve 76 and then along pipe 83 to the top of the cylinder of jack 38. This will force the piston 38' downwardly and will produce a flow of the displaced fluid through pipe 84 and the valve 76 to the pipe 75 and then through pipe 74 to port 65 of the valve 62, thereafter passing through pipe 66 to the tank. In the event that independent adjustment of the jack 38 is desired the valve 62 may be moved to bring its passageway 63 in register with the pipe 72 and the valve 76 may be moved to the dotted line position shown in the drawings, which will cause the fluid under pressure to be delivered from valve 76 to the top of the jack 38 through the pipe 83 and the displaced fluid to be transferred from the bottom of jack 38 to the bottom of the jack 37 through the valve 76 and the pipe 85. This will simultaneously move the pistons of the jacks 37 and 38 in opposite directions.

If however the valve 62 is adjusted so that flow of fluid from the pump 58 is established to the pipe 71 the fluid will initially move into the top of cylinder 37 through the pipe 86 and into the bottom of the jack 38 through the pipes 85 and 84. By this arrangement it is possible to set the blade 30 in any tilted position with the valve 76 rotated as indicated by dotted lines and to thereafter restore the valve 76 to its solid line position, at which time it will be possible to simultaneously actuate the pistons in the same direction while maintaining the blade 30 in its tilted position. In the event that excessive pressure is applied to the blade tending to transmit an unbalanced force to the two cylinders 37 and 38, this force can be relieved and compensated by the relief valve 73. For example it will be assumed that the pistons 37' and 38' are disposed in any set position with relation to each other as previously determined by manipulation of valve 76 and that excessive force is applied to the end of the blade adjacent the piston of cylinder 37. At this time the valve 62 stands neutral as shown in Fig. 3 of the drawings. The force will act on the fluid in cylinder 37 to move it along pipe 85 to valve 76, then through pipe 83 to the forward end of cylinder 38. This will tend to force the piston 38' downwardly and move the fluid within cylinder 38 outwardly through pipe 84 to valve 76. The fluid will then pass through pipe 75 and since it cannot circulate through valve 62 will act to open relief valve 73. This will establish communication between pipes 75 and 86 so that fluid may flow to the outer end of cylinder 37 to occupy the area from which piston 37' was forced to move due to the unbalanced pressure condition.

It will thus be seen that the structure here shown provides means whereby the dirt moving blade may be readily actuated and maintained in a desired set position, irrespective of the irregularities of the terrain over which the machine passes, and that flexible control means are provided to make possible adjustment of the blade and easy manipulation when desired with safety features whereby the hydraulic system will be compensated and balanced under unequal load strains supplied to the blade.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A machine for moving dirt and the like comprising a tractor, track laying units disposed at the opposite sides thereof and pivoted with relation to the tractor adjacent the rear ends thereof, a blade disposed transversely of the front of the tractor structure, a blade frame substantially U-shaped to extend across the front of the tractor and along opposite sides thereof and to the front of which the blade is secured, means articulately connecting the blade supporting frame to the rear of the tractor for vertical movement and transverse tilting movement, lifting means disposed at opposite sides of the tractor and articulately connected with the blade supporting frame to move the same, a pair of hydraulic jacks one connected to each lifting mechanism, a source of fluid under pressure for said jacks, valve means for controlling the flow of pressure fluid to the jacks for simultaneously actuating both of the jacks in the same direction in lifting and lowering the blade supporting frame, valve means for simultaneously actuating said jacks in opposite directions, and means whereby pressure applied unequally to the two jacks by the blade will be compensated by the transfer of pressure fluid to opposite sides of the pistons of the jacks automatically.

2. A machine for moving dirt and the like which comprises a tractor, a blade disposed transversely thereof, a frame by which the blade is carried, said frame being articulately connected with the tractor, separate actuating means disposed at the opposite sides of the tractor and by which the blade may be vertically moved and transversely tilted, a pair of hydraulic jacks one for each of said blade moving means, a power unit for delivering pressure fluid to said jacks, conduits connected with opposite ends of said jacks in series, a valve structure in communication with said conduits and through which pressure fluid may be directed to the jacks in series in alternate selected directions, a second valve controlling the flow of fluid from the power unit to the first named valve and by which the two jacks may be simultaneously actuated in a single direction.

3. A machine for moving dirt and the like which comprises a tractor, a blade disposed transversely thereof, a frame by which the blade is carried, said frame being articulately connected with the tractor, separate actuating means disposed at the opposite sides of the tractor and by which the blade may be vertically moved and transversely tilted, a pair of hydraulic jacks one for each of said blade moving means, a power unit for delivering pressure fluid to said jacks, conduits connected with opposite ends of said jacks in series, a valve structure in communication with said conduits and through which pressure fluid may be directed to the jacks in series in alternate selected directions, a second valve controlling the flow of fluid from the power unit to the first named valve and by which the two jacks may be simultaneously actuated in a single direction, and a relief valve interposed in the line of flow of pressure fluid from one jack to the other whereby excessive pressure applied to one of the jacks by the blade will permit an adjustment of the pressure fluid in the two jacks to compensate and equalize the pressure in the two jacks.

4. In a machine for moving dirt and the like, a tractor, a dirt engaging member, means at the opposite sides of the tractor for moving said dirt engaging member to lift or transversely tilt the same, a pair of hydraulic jacks carried by the tractor and each having a cylinder and piston, moving means connecting separately with the piston of a jack, a pressure fluid reservoir, power means for withdrawing said fluid from the reservoir and imposing a pressure thereon, conduits leading from the opposite ends of the jacks, a valve structure adapted to be moved to alternate positions to establish alternate flow of fluid to the opposite ends of the jacks in series, and a second valve structure interposed between the power unit and the jacks whereby pressure fluid may be delivered simultaneously to both of said jacks in the direction determined by the setting of the first named valve.

5. In a machine for moving dirt and the like, a tractor, a dirt engaging member, means at the opposite sides of the tractor for moving said dirt engaging member to lift or transversely tilt the same, a pair of hydraulic jacks carried by the tractor and each having a cylinder and piston, moving means connecting separately with the piston of a jack, a pressure fluid reservoir, power means for withdrawing said fluid from the reservoir and imposing a pressure thereon, conduits leading from the opposite ends of the jacks, a valve structure adapted to be moved to alternate positions to establish alternate flow of fluid to the opposite ends of the jacks in series, and a second valve structure interposed between the power unit and the jacks whereby pressure fluid may be delivered simultaneously to both of said jacks in the direction determined by the setting of the first named valve, and whereby the displaced fluid in the two jacks may return to the storage tank.

6. In a machine for moving dirt and the like, a tractor, a dirt engaging member, means at the opposite sides of the tractor for moving said dirt engaging member to lift or transversely tilt the same, a pair of hydraulic jacks carried by the tractor and each having a cylinder and piston, moving means connecting separately with the piston of a jack, a pressure fluid reservoir, power means for withdrawing said fluid from the reservoir and imposing a pressure thereon, conduits leading from the opposite ends of the jacks, a valve structure adapted to be moved to alternate positions to establish alternate flow of fluid to the opposite ends of the jacks in series, and a second valve structure interposed between the power unit and the jacks whereby pressure fluid may be delivered simultaneously to both of said jacks in the direction determined by the setting of the first named valve, the second named valve being adapted to be closed in a set position to hold the pistons of the jacks against movement.

7. In a machine for moving dirt and the like, a tractor, a dirt engaging member, means at the opposite sides of the tractor for moving said dirt engaging member to lift or transversely tilt the same, a pair of hydraulic jacks carried by the tractor and each having a cylinder and piston, moving means connecting separately with the piston of a jack, a pressure fluid reservoir, power means for withdrawing said fluid from the reservoir and imposing a pressure thereon, conduits leading from the opposite ends of the jacks, a valve structure adapted to be moved to alternate positions to establish alternate flow of fluid to the opposite ends of the jacks in series, a second valve structure interposed between the power unit and the jacks whereby pressure fluid may be delivered simultaneously to both of said jacks in the direction determined by the setting of the first named valve, the second named valve being adapted to be closed in a set position to hold the pistons of the jacks against movement, and a relief valve adapted to permit a transfer of fluid from one side to the opposite side thereof when unequal pressure is applied to one of the jacks by the blade.

8. A machine for moving dirt and the like comprising a tractor, a dirt moving element carried thereby, supporting means for said moving element whereby it may be vertically lifted or transversely tilted, a pair of hydraulic jacks each comprising a cylinder and a piston, the piston of one jack being connected to the blade supporting means at one side of the tractor and the piston of the opposite jack being connected to the blade supporting means at the other side of the tractor, a fluid pressure pump, conduits connecting the jacks in series with said fluid pressure pump whereby the pistons of said pump may be simultaneously moved in alternate directions, the diameters of the pump cylinders bearing a ratio to each other such as to cause equal movement of the two pistons, irrespective of the fact that the volumetric capacity of the portion of the cylinders on opposite sides of their pistons differs due to the presence of a piston rod on one side of each piston.

9. A machine for moving dirt and the like comprising a tractor, track laying units disposed at the opposite sides thereof and pivoted with relation to the tractor adjacent the rear ends thereof, a blade disposed transversely of the front of the tractor structure, a blade frame substantially U-shaped to extend across the front of the tractor and along opposite sides thereof and to the front of which the blade is secured, means articulately connecting the blade supporting frame to the rear of the tractor for vertical movement and transverse tilting movement, lifting means disposed at opposite sides of the tractor and articulately connected with the blade supporting frame to move the same, a pair of hydraulic jacks one connected to each lifting mechanism, a source of fluid under pressure for said jacks, valve means for controlling the flow of pressure fluid to the jacks for simultaneously actuating both of the jacks in the same direction in lifting and lowering the blade supporting frame, valve means for simultaneously actuating said jacks in opposite directions, and means whereby pressure applied by the blade to the jacks will cause an adjustment of fluid within and between said jacks to maintain the blade in its transverse set position.

10. In combination with a tractor, a transverse scraper blade in advance thereof, a frame connected with the blade and connected with the tractor whereby the blade and the frame may be raised, lowered and tilted as a unit, a pair of hydraulic rams having pressure chambers on either side of their pistons, said rams being carried by the tractor and connected with the frame for performing said operations, a source of fluid under pressure adapted to be placed in communication with said rams, fluid connections between said source of fluid under pressure and the rams whereby one of the rams will be actuated by fluid passing directly from said source and the other of said rams will be actuated by the fluid displaced from the first named ram.

11. In combination with a tractor, a transverse scraper blade in advance thereof, a frame connected with the blade and connected with the tractor whereby the blade and the frame may be raised, lowered and tilted as a unit, a pair of hydraulic rams carried by the tractor and connected with the frame for performing said operation, a source of fluid under pressure adapted to be placed in communication with said rams, said rams having pressure chambers on both sides of their pistons, fluid connections between said source of fluid pressure and the pressure chambers whereby one of the rams will be actuated by fluid passing directly from said source and the other of said rams will be actuated by the fluid displaced from the first named ram and control means for establishing the direction of flow of the pressure fluid to and through said rams.

12. In combination with a tractor, a transverse scraper blade in advance thereof, a frame connected with the blade and connected with the tractor whereby the blade and the frame may be raised, lowered and tilted as a unit, a pair of hydraulic rams carried by the tractor and connected with the frame for performing said operations, said rams having pressure chambers on both sides of their pistons, a source of fluid under pressure adapted to be placed in communication with said rams, fluid connections between said source of fluid under pressure and the rams whereby one of the rams will be actuated by fluid passing directly from said source and the other of said rams will be actuated by the fluid displaced from the first named ram and control means for establishing the direction of flow of the fluid pressure to and through said rams whereby the pressure fluid may be locked in the circulating system to hold the moving parts of the rams and the scraper blade in a set position.

13. A dirt moving machine including a tractor, a material moving member disposed transversely of the tractor, means articulately supporting the material moving member with relation to the tractor whereby the blade and the articulate support may be free to be bodily raised or lowered or to be longitudinally tilted, a pair of hydraulic rams of equal fluid capacity having pressure chambers on both sides of their pistons, said rams being carried by the tractor and connected to the articulate support, a source of fluid under pressure therefor, connections between the source of fluid under pressure and the pressure chambers of the rams and connections between the rams whereby the pistons of the rams may simultaneously move in opposite directions due to the delivery of the pressure fluid to one of the rams and the delivery of displaced fluid from said first mentioned ram to the opposite end of the second mentioned ram, and lever means connecting operative parts of the ram with the material moving member.

CHARLES LE BLEU.